United States Patent
Koemmerling

(10) Patent No.: US 9,749,589 B2
(45) Date of Patent: Aug. 29, 2017

(54) METHODS FOR THE COVERT TRANSMISSION OF DATA FOR IDENTIFICATION

(71) Applicant: Oliver Koemmerling, Punta del Este (UY)

(72) Inventor: Oliver Koemmerling, Punta del Este (UY)

( * ) Notice: Subject to any disclaimer, the term of this patent is extended or adjusted under 35 U.S.C. 154(b) by 0 days.

(21) Appl. No.: 14/450,635

(22) Filed: Aug. 4, 2014

(65) Prior Publication Data

US 2014/0344851 A1   Nov. 20, 2014

Related U.S. Application Data

(63) Continuation of application No. 13/512,083, filed as application No. PCT/IB2009/007825 on Nov. 25, 2009, now Pat. No. 8,949,881.

(51) Int. Cl.
| | | |
|---|---|---|
| G06F 7/04 | (2006.01) | |
| H04L 9/32 | (2006.01) | |
| H04L 1/00 | (2006.01) | |
| H04N 7/167 | (2011.01) | |
| H04N 21/418 | (2011.01) | |
| H04N 21/6332 | (2011.01) | |
| H04N 21/6377 | (2011.01) | |
| H04N 21/266 | (2011.01) | |

(52) U.S. Cl.
CPC ....... *H04N 7/1675* (2013.01); *H04N 21/4181* (2013.01); *H04N 21/6332* (2013.01); *H04N 21/63775* (2013.01); *H04N 21/26606* (2013.01)

(58) Field of Classification Search
CPC ............ H04N 7/1675; H04N 21/6332; H04N 21/4181; H04N 21/63775; H04N 21/26606
USPC .................... 726/9, 13; 713/168; 370/230
See application file for complete search history.

(56) References Cited

U.S. PATENT DOCUMENTS

| | | | | |
|---|---|---|---|---|
| 2006/0062320 A1* | 3/2006 | Luz | ....................... | H04K 1/006 375/269 |
| 2007/0253337 A1* | 11/2007 | Morinaga | ........... | H04L 12/6418 370/249 |
| 2009/0016265 A1* | 1/2009 | Katayama | ............. | H04L 1/1887 370/328 |
| 2010/0195656 A1* | 8/2010 | Matsushita | ....... | H04W 74/0825 370/392 |
| 2014/0064301 A1* | 3/2014 | Rison | .................. | H04W 74/085 370/448 |
| 2014/0269667 A1* | 9/2014 | Teague | .............. | H04W 56/0065 370/350 |
| 2015/0046560 A1* | 2/2015 | Alibakhsh | ........... | H04L 65/4076 709/217 |

* cited by examiner

*Primary Examiner* — Aravind Moorthy
(74) *Attorney, Agent, or Firm* — Jesse Delcamp

(57) ABSTRACT

A method for determining an identifier of a conditional access card used in a conditional access system, in which the conditional access card autonomously modulates the timing of data packets sent by the conditional access card, according to a sequence that depends on the identifier of the card. The sequence is generated by a predefined non-linear function stored on the conditional access card, and the predefined non-linear function depends on both the identifier of the conditional access card and a non-linear random sequence that is known to the conditional access card and a monitoring station that receives transmissions from the conditional access card.

35 Claims, 2 Drawing Sheets

METHODS FOR THE COVERT TRANSMISSION OF DATA FOR IDENTIFICATION

CROSS REFERENCE TO RELATED APPLICATIONS

This application is a continuation of co-pending U.S. patent application Ser. No. 13/512,083, entitled, "Card Sharing Countermeasures," filed Oct. 18, 2012, which is a National Stage of International Application No. PCT/IB2009/007825 filed Nov. 25, 2009, the contents of which are incorporated herein by reference in their entirety.

FIELD OF THE INVENTION

The present invention relates generally to the Pay-TV piracy field and more particularly to card sharing attack.

BACKGROUND OF THE INVENTION

Thanks to the notable improvement in digital broadcasting platforms which contribute towards a broader reception of digital contents, Pay-TV is ever evolving and gaining more and more audiences. However, this evolvement has to be escorted by security measures as hackers are unceasingly looking for new issues and vulnerabilities so as to acquire an unauthorized reception on their satellite or cable TV system.

Hence, in order to protect their investments and safeguard their revenue streams, Pay-TV providers have to rely on a strict Conditional Access System (CAS). CAS is responsible for ensuring that broadcasted contents are accessible only to those customers who have satisfied clearly specified conditions, mainly payment related.

To that end, the CAS involves two main components: a source-side component, and a reception-side component.

At the source-side, the digital content to be broadcasted (including video, audio and data) and which the provider wishes to restrict access, is encrypted (by using common DVB scrambling algorithms) with a cryptographic key, called a Control Word (CW). The CW is generated by a pseudo-random binary sequence generator (CW Generator). More generally, the CW is changed every few seconds (mostly, with a periodicity between 2 and 10 s).

Since there is no return channel or any other means to negotiate with legitimate Satellite or Terrestrial receivers, the CW, in turn, needs to be protected then carried by the broadcasted content itself. The CW is, thus, encrypted with a function specific to each CAS manufacturer, and is then packaged into so-called Entitlement Control Message (ECM).

Further, the Viewing rights of the individual subscriber is managed by the so called Subscriber Management System (SMS) and updates or changes in rights are packaged with entitlement data into so-called Entitlement Management Message (EMM).

Therefore, the resulting scrambled content, ECM, and EMM are broadcasted together in the same channel in only one scrambled stream.

At the reception-side, the CAS, mainly, includes an Integrated Receiver/Decoder (IRD), Television and a smart card, which are generally both comprised within a Set-top box (STB).

The IRD receives the scrambled streams which comprises the encrypted content, the ECM and the EMM. The IRD filters from the received stream the ECM and the EMM according to the parameters provided by the card and then forwards these messages to the card.

If the card belongs to the right broadcaster and is not revoked, then the card decrypts the ECM into a plain CW and transfers it back to the IRD so that IRD will be able to descramble the scrambled content (Video Image).

The descrambled content is then forwarded to a terminal user able to display such stream as a television or a computer.

The CW is very vulnerable to the link between the card and the IRD. In fact, by eavesdropping the communication of the card, an attacker may easily redirect the decrypted CW to others IRD to descramble the encrypted content. In other words, an attacker can effortlessly obtain the CW in the plaintext form while its transmission from the card to the IRD. Therefore, the attacker can distribute the obtained CW through Internet or radio means to unauthorized users so that they freely enjoy the protected content, without any subscription.

Such attack is known as "control word redistribution", "CW sharing", or "card sharing", by which one legitimate user colludes to an unrestricted number of illegitimate users to provide unauthorized access to a protected content. In particular, by acting as a card server in a push system or a pull system way, only one legitimate card can provide numerous illegitimate receivers with free-access to an encrypted content, resulting in a serious threat to the security of the CAS.

In a push system, the card sharing pirate runs one or more IRD's, intercepts the CWs and sends all of them to clients. A client software application selects the needed CW for the watched channel out of the whole packet and loads it into its IRD's.

In a pull system one or more card, connected to a card server running on a PC are shared among Clients. As soon as an ECM is received by a client IRD, it is forwarded to the card server in order to be processed. The card server subsequently carries out the message decryption and forwards back to each client the decrypted CW. As a forward channel is needed to provide the ECM, such implementation can be deployed only on two-way connections, namely on Internet network.

Even if Pay-TV providers resort to—frequently changing the CW, card sharing remain possible as the crypto period (generally around 7 seconds) is relatively greater than the required time to provide, in real-time, the CW to almost any person on the planet.

Accordingly, card sharing is more and more popular among network communities as it is powerful and easily deployable (no exhaustive smart card compromising or IRD manipulating) which makes of card sharing attack a significant security threat to be overcome.

It is in one object of the present invention to counteract card sharing attack.

Another object of the present invention is to remotely identify a shared card.

Another object of the present invention is to provide a method for card sharing prevention with the least modification on the underlying CAS hardware.

Another object of the present invention is to remotely identify a shared card, whatever deployed in a push system or a pull system manner.

Another object of the present invention is to be able to remotely identify a plurality of cards which are jointly shared via a card server.

Another object of the present invention is to provide a low computational complexity method for remotely identifying a shared card.

Another object of the present invention is to provide a method for retrieving the identifier of a shared card without any functional disturbance of the IRD.

Another object of the present invention is to pinpoint the identifier of a shared card in an invisible way for card sharers.

Another object of the present invention is to provide CAS managers with a plurality of decisions against shared card owners.

Another object of the present invention is to permit a remote identification of a shared card from almost any access point to the pirate network.

Another object of the present invention is to provide an outgoing communication method for the card.

Another object of the present invention is to cleverly dissimulate the identifier of the card in its outgoing communication.

BRIEF DESCRIPTION OF THE DRAWINGS

The objects, advantages and other features of the present invention will become more apparent from the following disclosure and claims. The following non-restrictive description of preferred embodiments is given for the purpose of exemplification only with reference to the accompanying drawings in which:

SUMMARY OF THE INVENTION

Figure 1:
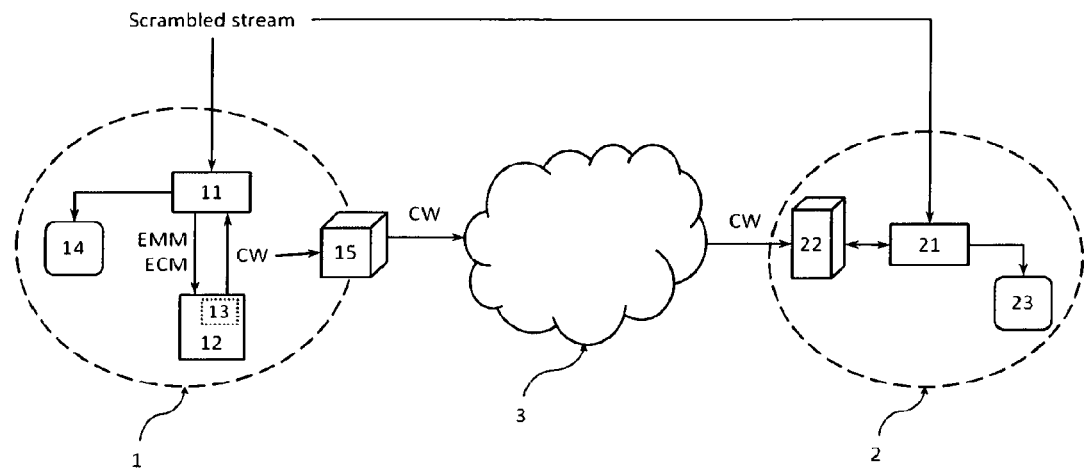
FIG. 1 is a block diagram showing a monitoring station connected to the pirate network in order to remotely recover the identifier of a shared card.

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key critical elements of the invention or to delineate the scope of the invention. Its sole purpose is to present some concepts in a simplified form as a prelude to the more detailed description that is discussed later.

The present invention further relates to a method for identifying at least an identifier of a conditional access card used in a control word redistribution system by passing information over a side channel, said method comprising a modification step of the response time, of the card, to a control word request, according to a predefined function which depends on the identifier of the said cards.

The present invention further relates to a computer program product for remotely identifying at least one shared card over a pirate network and comprising:
 a program code for measuring the response time signature from acquired control word from the pirate network;
 a program code for calculating expected response time signatures from the retrieved control words by using the set of possible identifiers of the shared card;
 a program code for measuring the correlation between the measured response time signature and each one of the expected response time signatures.
 a program code for determining the argument of the maximum of the correlation measurement among the set of possible identifier of the shared card, the determined code being estimated to be the identifier of the shared card.

While the invention is susceptible to various modification and alternative forms, specific embodiments thereof have been shown by way of example in the drawings. It should be understood, however, that the description herein of specific embodiments is not intended to limit the invention to the particular forms disclosed.

It may of course be appreciated that in the development of any such actual embodiments, implementation-specific decisions should be made to achieve the developer's specific goal, such as compliance with system related and business-related constraints. It will be appreciated that such a development effort might be time consuming but may nevertheless be a routine understanding for those or ordinary skill in the art having the benefit of this disclosure.

DETAILED DESCRIPTION OF ILLUSTRATIVE EMBODIMENTS

With reference to FIG. 1, there is shown, in the left-hand side, a legitimate user 1 provided with
 an Integrated Receiver/Decoder (IRD) 11
 a legitimate card 12 and preferably
 a terminal user 14 able to display a multimedia (video, audio, data) content. A television or a computer are examples of such terminal user 14.

The legitimate user 1 is receiving, on his IRD 11, a scrambled stream, namely a pay-tv stream, via adequate reception means such as a satellite dish, an antenna or a cable connection.

The card 12 decrypts the control word CW from the EMM and the ECM which are forwarded thereto from the IRD 11. Subsequently, the card 12 transfers back the decrypted control word CW, in plaintext form, to the IRD 11.

According to the philosophy of card sharing attack, the control word CW furnished by the card 12 and permitting to descramble the received scrambled stream, is being diffused or provided on request by the card server 15 through the (wireless or wired) pirate network 3. It is to be noted that the card server 15 may relay more than smart card 12 output, in order to jointly serve a plurality of requests concerning the same or different control words. Typically, the pirate network 3 is a two-way communication network, such as Internet, Intranet, a Local Area Network, a Wide Area Network or a Metropolitan Area Network.

Generally, the card 12 may be uniquely identified by a certain identifier 13. The identifier 13 of a card is commonly an alphanumeric word of a finite number of characters (generally named "serial number" or "code"). As illustrative examples, the identifier 13 of the card 12 may be of the following form OA852786, 576F18C, 99E58CB001X.

In a preferred embodiment, the response time of the card 12 is used to dissimulate therein its identifier 13. The response time of a card is intended here to mean the elapsed time between
 the reception time, by the card 12, of an EMM/ECM in order to provide in return the decrypted control word CW; and
 the time at which the control word CW is decrypted, by the card 12, and it is ready to be communicated.

In fact, conventionally, the response time of a card 12 is limited to the required time by the card 12 to make out the CW from the received EMM and ECM. However, the response time of a card 12 is composed of the required time to decipher the control word CW plus an inserted time delay which is function of the identifier 13 of the card 12.

Then, the identifier 13 of the card 12 may be coded in terms of response times of the smart card 12, whereas the control word CW itself is kept unchanged. Namely, a time delay offset may be purposely included before the delivery of the control word CW at the level of the outgoing communication interface of the card 12. Explicitly, a predefined delay time may be inserted or not before the card 12 answer to a control word CW request in such a way that its identifier 13 may be deduced from a numerous observations of its response time (response time signature) taken by a monitoring station 2 via control word CW requesting.

The monitoring station 2, connected to the pirate network 3, is equipped with
- a processing unit 22;
- an Integrated Receiver/Decoder (IRD) 21

Preferably, the monitoring station 2 is further provided with a terminal user 23 able to display a descrambled stream.

The processing unit 22 is charged for:
- formatting requests, towards the card server 15, for control words CW related to the received scrambled stream on the IRD 21 (if the card server 15 works according to a pull system) or
- selecting, among received control words CWs from the pirate network 3, the right control word CW to decrypt the scrambled stream received on the IRD 21 (if the card server 15 works according to a push system);
- load the obtained control word CW into the IRD 21 and particularly
- focus on the response time of cards which are the sources of the obtained control words CWs.

The analysis of the response times of a card aims, mainly, at recreating the response time signature of shared cards, and consequently the card identifier which is encrypted within response times to control word requests over the pirate network 3.

It is to be noted that the monitoring station 2 may be connected from anywhere within a communication network comprising a card sharing access.

Figure 2:
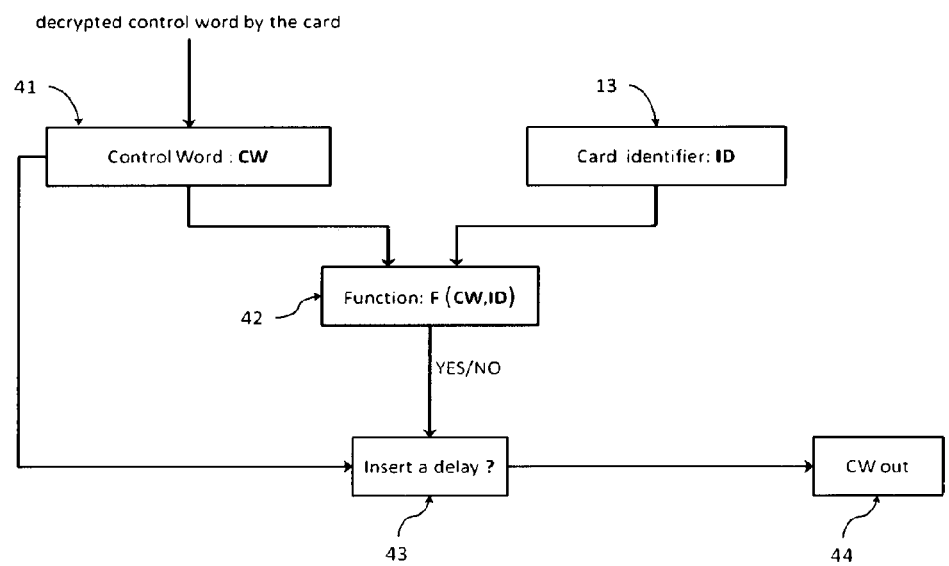
FIG. 2 is a block diagram illustrating one embodiment of outgoing communication of a card, upon the reception of a CW request, whatever from an IRD or from a pirate network.

With reference now to FIG. 2, the insertion decision 43 of a time delay depends on the output of a predefined function 42. The predefined function 42 is function of the card identifier 13 and the requested control word 41. It must be noted that the predefined function 42 may be the combination or the juxtaposition of more than one function.

Preferably, the output of the predefined function 42 has one-bit length output (1="yes", 0="no"), as it is shown on FIG. 2. Then, the one-bit length output of the function 42, calculated for each control word 41 request, is used to decide on the insertion or not of a predefined delay time. For example,
- if the output of the function 42 is equal to "1", then a delay offset is applied before the transmission of the requested control word 41; and
- if the output of the function 42 is equal to "0", then no delay to be introduced and the requested control word 41 is communicated as soon as it is decrypted.

The function 42 is chosen in such a way that each bit of the binary writing of the card identifier 13 is concerned by the function 42. In other words, the definition domain of the function 42 must comprise all the bits of the binary writing of the card identifier 13. By binary writing of a character, the writing of the character in the alphabet {0, 1} is meant.

It is to be noted that the output of the function 42 may be more than 1-bit length and at any other alphanumerical form, but the insertion decision 43 has to be adapted accordingly. Any switch-case statement may be applied on the output of the function 42. For example, if the output of the function 42 is equal to "01" then insert a delay, else don't insert a delay. Moreover, one can even define more than one time delay level to be inserted, such as insert the half of the time delay offset or all the time delay offset.

Figure 3:
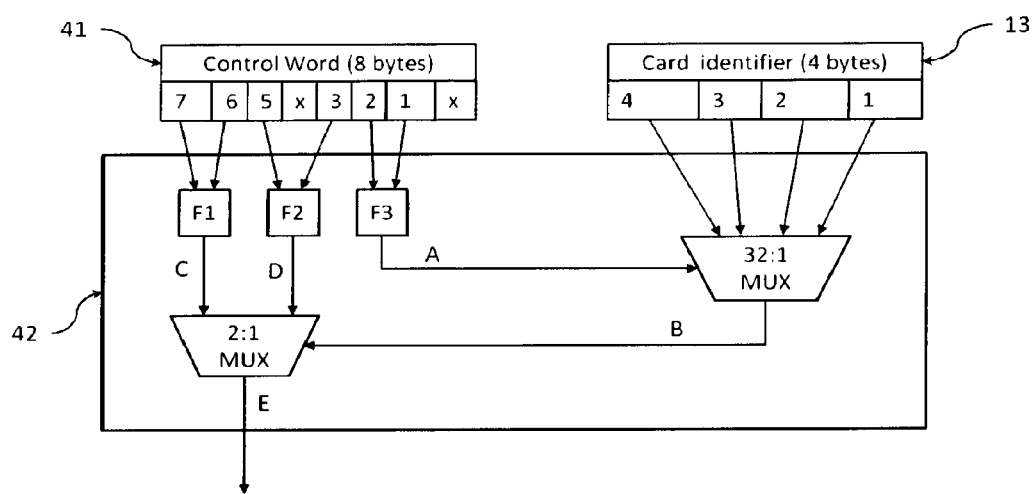
FIG. 3 is a block diagram illustrating a functional module.

FIG. 3 shows an illustrative example of the function 42. In this example, it is supposed that
- the identifier 13 is a 32 bits word (4 bytes);
- the control word itself is used as random source to encode the identifier 13 of the card 12 in temporal information (response time); and
- the control word is 8 bytes length wherein 2 bytes are used as checksum.

As it is shown in FIG. 3, the example of function 42 comprises a 32-to-1 multiplexer, a 2-to-1 multiplexer and three functions F1, F2 and F3. A 5 bit length word A is given by the function F3 from the bytes 1 and 2 of the currently requested control word 41. The binary word A is used to address the 32-to-1 multiplexer in order to select the corresponding bit from the card identifier 13. The selected bit B is forwarded to the 2-to-1 multiplexer. Functions F1 and F2 permit, respectively, to extract 1-bit length words C and D. C and D are respectively resulted from the couple of bytes (3,5) and (6,7) of the current control word 41. Then, in function of the value of one-bit length word B, the output E of the 2-to 1 multiplexer will be the one-bit length word C or D. The output E will be used, here, as the signature bit for the current crypto-period (or the current control word 41). Logical functions "AND", "OR", "NOR", "XOR", "XNOR", "NANO" or any combination of them are examples of functions F1, F2, and F3.

In a variant embodiment, in addition to the card identifier 13, another or a combination of other control words are utilized by the function 42. As an example, one mentions the current control word, the already transmitted control word or both.

Advantageously, the CW itself may be used as random source to encode the card identifier in temporal information (response time of the card).

Preferably, the bits of the binary writing of the card identifier 13 are randomly multiplexed.

In a variant embodiment, a random sequence, generated by a predefined pseudo-random sequences generator, is used instead of the control word 41.

The above tasks may be accomplished with a subroutine loaded on the smart card. This subroutine may have the following structure:

```
Subroutine
    delay_bit = Function(requested_control_word_ 41, card_identifier_13)
      If delay_bit = 1
        then wait_time x
      end_if
    return
``` where delay_bit, Function and x are, respectively, the output of the function 42, the function 42, and a chosen time delay to be waited before the transmission of the currently requested control word 41. In this example of subroutine loaded on the card 12, the insertion of the time delay $\underline{x}$ depends on the value of delay_bit.

Preferably, the time delay to be waited $\underline{x}$ is chosen in regards
to the control word changing periodicity; and
to the time delay spread which may be inevitably added by the communication channel that links the legitimate user 1 to the monitoring station 2.

Preferably, the time delay to be waited is chosen in such a way that is significantly inferior to the control word changing periodicity and averagely superior (of the same order or preferably superior) to the channel time-delay spread (maximum time delay which is introduced by the pirate network 3).

The illustrative above subroutine has to be called upon each control word request, or, equivalently, for each cryptoperiod.

Once the decision on delay insertion 43 is taken and applied, the requested control word 41, through the output communication interface 44, is
communicated to the IRD 11, or
sent to the monitoring station 2 as any other client, over the pirate network 3.

The monitoring station 2, anywhere within a communication network having an access to the pirate network 3, aims at recreating the card 12 signature from the received control words which are decrypted by the shared card 12. At the monitoring station 2 side, the observation of the presence/absence of such intentionally inserted time delay in comparison with the arrival time of an ECM at the processing unit 22 (or equivalently at the IRD 21), certainly, reveals information about the identifier 13 of the card 12. But, obviously, the intentionally inserted time delay will be indeed "noised" by an additive propagation delay introduced by the communication channel over the pirate network 3 (network jitter, Internet routers, satellite uplink, and modems for example). Advantageously, the added propagation delay may be approximated by a random process, as a noise. Thus, the randomly added noise may be easily overcome (attenuated or even cancelled) by collecting a large number of observations on the responses times of the shared card 12. The more noise there, the more observations are needed to better extract the useful information (the response time of shared card 12 and by the way the shared card identifier 13).

Aiming at recreating the response time signature of the shared card 12, the processing unit 22
calculates the difference between the arrival time of the requested control word 41 and the arrival time, to the processing unit 22, of its correspondent ECM; and
repeats the above calculation for a large observation number N of received control words 41 from the card server 15.

More explicitly, such processing may be accomplished with a subroutine of the form:
For i=1 to N do
get ECM from the local IRD 21
set T_ECM=the local time
request, from the card server 15, the control word CW relative to the ECM;
set T_CW=the local time
set measured_vector(i)=(T_CW−T_ECM)
set CW_List(i)=CW
loop i Accordingly, the response time of the shared card 12 is measured in regards to the reception times of ECMs (or equivalently of EMMs) on the local IRD 21.

In order to recover the identifier 13 of the shared card 12, the processing unit 22 conducts a statistical analysis of the response time signature, achieved through a correlation measure between the measured response time signature (named measured_vector in the above illustrative subroutine) and the expected one.

As the processing unit 22 does not know, a priori, the identifier 13 of the shared card 12, it has to calculate all the set of possible response time signatures of the shared card 12, given by successively using all possible identifiers of a card of the same type as the shared card 12. Obviously, the identifier 13 of the shared card 12 exists among the set of possible identifiers. Consequently, the expected response time vector will be certainly the one who shows the maximum similarity (maximum correlation with the measured vector) with the measured one.

Accordingly, suppose that the set of possible identifiers of the shared card 12 counts M (M may be given by 2m, where m is the length of the binary writing of the maximum value of identifiers). Then, for each candidate of this set, the processing unit 22 has to calculate the response time signature from the same N control words (N is the number of observations) obtained from the card server 15. Notably, main steps of such processing are as following
for k=1 to M % M being the number of possible identifiers in the system
For i=1 to N % N being the number of retrieved control words delay_bit=Function(CW_list(i), one_possible_card_identifier) expected_vector(i)=delay_bit
Loop i
Expected_matrix(:, k)=expected_vector
Loop k It is to be noted that "Function(CW_list(i), one_possible_card_identifier)" is the same function 42 which is used by the shared card 12, applied on the control word numbered i among the N observed control words and stacked in the vector named CW_list.

The output of the above illustrative subroutine may be stacked in a 2-dimensional matrix (named here Expected_matrix) of size N×M and wherein
each row corresponds to one retrieved control word; and
each column represents a response time vector calculated with one possible identifier of the shared card 12.

By calculating the correlation between, each column of the obtained matrix and the measured vector of response times, the identifier 13 of the shared card 12 will be, subsequently, given by the argument of the maximum value of the calculated correlation coefficients.

Such processing may be formulated as follow:
For k=1 to M % M being the number of possible identifiers in the system
Correlation_results(k)=correlation(measured_vector, Expected_matrix(:, k))
Loop k
Estimated_Identifier_of_shared_card=arg(max(Correlation_results))
where "correlation" is a function returning the correlation coefficient between two vector of the same size, and "Expected_matrix(:,k)" is a column vector of order k from the 2-dimentional matrix "Expected_matrix".

The loop output is a vector (named in the above example "Correlation_results") of size 1×M which contains the correlation coefficients and which may be plotted in function of the M possible values of card identifiers.

The identifier 13 of the shared card 12 (named in the above illustrative subroutine Estimated_Identifier_of_shared_card) is given by the argument of the maximum value of correlations coefficients plotted in function of the M possible identifiers of the shared card 12.

It is to be noted that when more than one shared card is linked to the card server 15, their identifiers are the arguments of maximum values of correlations coefficients plotted in function of the M possible identifiers. In order to easily identify the identifiers of more than one shared card linked to the card server 15, one can proceed by

- eliminating the argument of the global maximum of the correlation coefficients plotted against the possible identifiers;
- repeat the above processing with the remainder of possible identifiers until a threshold of the correlation coefficient amplitudes.

In a variant, the correlation is done on smaller portions (sub-vectors) of the identifier that can be analyzed separately. As an example, one can subdivide the card identifier into two sub-vectors (for example, subdividing an identifier of 32-bit length into two sub-vectors: bits from 1 to 16 and bits from 17 to 32). This may be faster as it reduces the computational complexity of the correlation calculation, to the detriment of more additional observations (more control words to be retrieved from shared cards).

It is to be noted that different embodiments of the processing unit 22 may be automatically performed by a computer program.

Once a shared card is identified, obviously, the broadcaster may take the decision that meets his action plan (for example, deactivate the card, exclude the card from the monthly key update, or contact the shared card owner).

Once the identifier of a shared card via a given card server is resolved, appropriate measures could follow. An example of counteraction would be the creation of a universal ECM which deactivates every shared card of a specific Manufacturer. For example, an ECM could be injected in pull systems on the pirate network 3. The card server 15 usually does not know if an ECM is valid/real or not since it can not decrypt it. Therefore it forwards it to the card 12 in order to be processed. On reception of such an ECM the card 12 (after decryption) could understands its purpose and, consequently, deactivates the subscription rights hence forcing the subscriber to call the broadcaster in order to reactivate it.

In another embodiment, a specific ECM may be dedicated for the remote identification of shared smart card. In fact, a pirate has no means of understanding what is inside an ECM. Therefore he cannot distinguish between a regular ECM and a faked one. Then, a special ECM could be created asking the shared card to respond with a CW with its identifier therein embedded.

In another embodiment, one can extend the CW by further bits which are not necessary for the decryption of the scrambled content but that represent, in an encoded form, the card identifier. A software application, loaded on card, is in charge of embedding the card identifier in the control word CW in such a way an eavesdropper could not exclude the unwanted bits from the intercepted CW. Accordingly, a shared card will automatically reveal its identifier. Therefore, a monitoring station provided with a card sharing access can easily identify the shared card identifier as soon as at least one control word is received.

In another embodiment, in a pull system, a card may be programmed to be automatically deactivated (self-deactivation) as soon as it receives a predefined sequence of requests. Preferably, the sequence of requests is defined in such a way is almost impossible to be unintentionally generated by the owner of a legitimate card. As an example of such sequence, one can mention predefined successive requests for transition between given television stations in a short time. Dedicated means may be loaded in the card in order to detect the predefined sequence of requests and subsequently deactivate the card. A computer program product comprising

- a program code for capturing the sequence over the hidden channel;
- a program code for correlating the captured sequence with the predefined sequence and
- a program code for comparing, and counteracting action is an example of such means.

Fraudulent use counteracting of conditional access cards used for the redistribution of Control Words (shared keys) in conditional access systems by passing information over a side channel may be achieved through a predefined sequence detection function inside the said cards and a computer program product to generate the sequence to be detected.

It is to be noted that the herein described embodiments are also valid for a local card sharing (within a home, hotel, campus or among neighbors).

Obviously, persons skilled in the art will readily appreciate how some teaching, such. as the data staking, the subroutines implementation or the subroutines optimization, may be modified within the spirit and scope of the appended claims.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting and the teachings of this disclosure may be applied to systems and methods which are similar but somewhat different than those which are discussed herein.

Now that the invention has been described,

What is claimed is:

1. A method for communicating data related to an electronic device, the method comprising the steps of:
   said electronic device autonomously modulating the timing of a plurality of data packets sent by said electronic device, to form a timing sequence that correlates to a predetermined data sequence, said timing sequence correlating to a signature of said electronic device.

2. The method of claim 1, further comprising:
   said timing sequence being generated by a predefined function stored on said electronic device.

3. The method of claim 1, further comprising:
   said timing sequence being a first sequence; and
   said first sequence depending on said data and a second sequence;
   said second sequence being a non-linear random sequence.

4. The method of claim 3, further comprising:
   said non-linear random sequence being known to said electronic device and a monitoring station that receives transmissions from said electronic device.

5. The method of claim 1, further comprising:
   said modulation of said timing not being in response to a request for a delay.

6. The method of claim 1, further comprising:
   said electronic device autonomously modulating the phase of the timing of a-cyclically occurring data packets sent by said electronic device.

7. The method of claim 1, further comprising:
   said timing sequence being generated locally by a non linear function using as a first input parameter a unique identifier of said electronic device and as a second input parameter a datum known to the electronic device and a monitoring station.

8. The method of claim 1, further comprising:
transmitting said timing sequence a plurality of times;
performing a correlation analysis to compare the plurality of timing sequence transmissions to a plurality of possible signatures of said electronic device to identify said unique signature.

9. A method for communicating data related to an electronic device, the method comprising the steps of:
modulating the timing of a plurality of data packets sent by said electronic device to form a timing sequence which correlates to a predetermined data sequence, said timing sequence correlating to a signature of said electronic device.

10. The method of claim 9, further comprising:
said timing sequence being generated by a predefined function stored on said electronic device.

11. The method of claim 10, further comprising:
said electronic device modulating the phase of the timing of a-cyclically occurring data packets sent by said electronic device.

12. The method of claim 9, further comprising:
said timing sequence being a first sequence; and
said first sequence depending on said data and a second sequence;
said second sequence being a non-linear random sequence.

13. The method of claim 9, further comprising:
said modulation of said timing not being in response to a request for a delay.

14. The method of claim 9, further comprising:
said timing sequence being generated by a non linear function using as a first input parameter a unique identifier of said electronic device and as a second input parameter a datum known to the electronic device and a monitoring station.

15. The method of claim 9, further comprising:
transmitting said timing sequence a plurality of times;
performing a correlation analysis to compare the plurality of timing sequence transmissions to a plurality of possible signatures of said electronic device to identify said unique signature.

16. An electronic device, comprising data:
said electronic device adapted to modulate the timing of a plurality of data packets sent by said electronic device to form a timing sequence which correlates to a predetermined data sequence, said timing sequence correlating to a signature of said electronic device.

17. The electronic device of claim 16, further comprising:
said timing sequence being generated by a predefined function stored on said electronic device.

18. The method of claim 17, further comprising:
said electronic device modulating the phase of the timing of cyclically occurring data packets sent by said electronic device.

19. The method of claim 16, further comprising:
said modulation of said timing not being in response to a request for a delay.

20. The electronic device of claim 16, further comprising:
transmitting said timing sequence a plurality of times;
performing a correlation analysis to compare the plurality of timing sequence transmissions a plurality of possible signatures of said electronic device to identify said unique signature.

21. The electronic device of claim 16, further comprising:
said timing sequence being a first sequence; and
said first sequence depending on said data and a second sequence;
said second sequence being a non-linear random sequence.

22. A method for communicating data related to an electronic device, the method comprising the steps of:
performing a predefined function, which depends on said data, to generate a sequence of phase modulations of communications correlated to a signature of said electronic device; and incorporating said sequence of phase modulations into communications of said data.

23. The method of claim 22, further comprising:
said predefined function being stored on said electronic device.

24. The method of claim 22, further comprising:
said predefined function depending on said data and a non-linear random sequence.

25. The method of claim 24, further comprising:
said non-linear random sequence being known to said electronic device and a monitoring station that receives transmissions from said electronic device.

26. The method of claim 22, further comprising:
performing a correlation analysis to compare said sequence of phase modulations of communications to a plurality of possible sequence of phase modulations of communications to identify said data.

27. The method of claim 22, further comprising:
said modulation of said phase not being in response to a request for a delay.

28. A method for communicating data related to an electronic device, the method comprising the steps of:
performing a predefined function, which depends on said data, to generate a sequence of timing modulations of communications correlated to a signature of said electronic device; and incorporating said sequence of timing modulations into communications of said data.

29. The method of claim 28, wherein:
said timing modulations of said communications comprises delaying transmission of individual communications.

30. An electronic device, comprising data:
said electronic device adapted to perform a predefined function, which depends on said data, to generate a sequence of phase modulations of communications correlated to a signature of said electronic device; and said electronic device adapted to incorporate said sequence of phase modulations into communications of said data.

31. The method of claim 30, further comprising:
said predefined function depending on said data and a non-linear random sequence.

32. The method of claim 31, further comprising:
said non-linear random sequence being known to said electronic device and a monitoring station that receives transmissions from said electronic device.

33. An electronic device, comprising data:
said electronic device adapted to perform a predefined function, which depends on said data, to generate a sequence of timing modulations of communications correlated to a signature of said electronic device; and said electronic device adapted to incorporate said sequence of timing modulations into communications of said data.

34. The method of claim 33, further comprising:
said predefined function depending on said data and a non-linear random sequence.

35. The method of claim 34, further comprising:
said non-linear random sequence being known to said electronic device and a monitoring station that receives transmissions from said electronic device.

\* \* \* \* \*